(12) United States Patent

Tammana

(10) Patent No.: US 12,681,756 B2

(45) Date of Patent: Jul. 14, 2026

(54) AUTOMATIC SYNCHRONOUS OR ASYNCHRONOUS EXECUTION OF REQUESTS

(71) Applicant: Salesforce, Inc., San Francisco, CA (US)

(72) Inventor: Sowmya Tammana, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 671 days.

(21) Appl. No.: 17/990,086

(22) Filed: Nov. 18, 2022

(65) Prior Publication Data

US 2024/0168798 A1 May 23, 2024

(51) Int. Cl.
*G06F 9/48* (2006.01)
*G06F 9/54* (2006.01)

(52) U.S. Cl.
CPC .......... *G06F 9/4881* (2013.01); *G06F 9/4887* (2013.01); *G06F 9/547* (2013.01)

(58) Field of Classification Search
None
See application file for complete search history.

(56) References Cited

U.S. PATENT DOCUMENTS

2024/0193022 A1* 6/2024 Saito ...................... G06F 13/00

* cited by examiner

*Primary Examiner* — Qing Yuan Wu

(74) *Attorney, Agent, or Firm* — Butzel Long

(57) ABSTRACT

Systems and techniques are provided that implement application programming interfaces (APIs) that can be executed synchronously or asynchronously depending on the expected response time of the API, the status of the API and/or systems that implement the API, the identity and/or type of user making a request via the API, historical requirements or operation of the API, and/or other factors.

18 Claims, 5 Drawing Sheets

20

AUTOMATIC SYNCHRONOUS OR ASYNCHRONOUS EXECUTION OF REQUESTS

BACKGROUND

Processes in computerized systems and applications typically can execute either synchronously or asynchronously. In synchronous execution, a request such as an application programming interface (API) request is executed by the same processing thread that receives the request and a result is returned to the requestor immediately upon execution of the request. In asynchronous execution, the request is queued for later execution by a separate processing thread. A request ID is returned immediately which is later used to retrieve the result by the requesting user, service, application, or the like.

DETAILED DESCRIPTION

Figure 1:
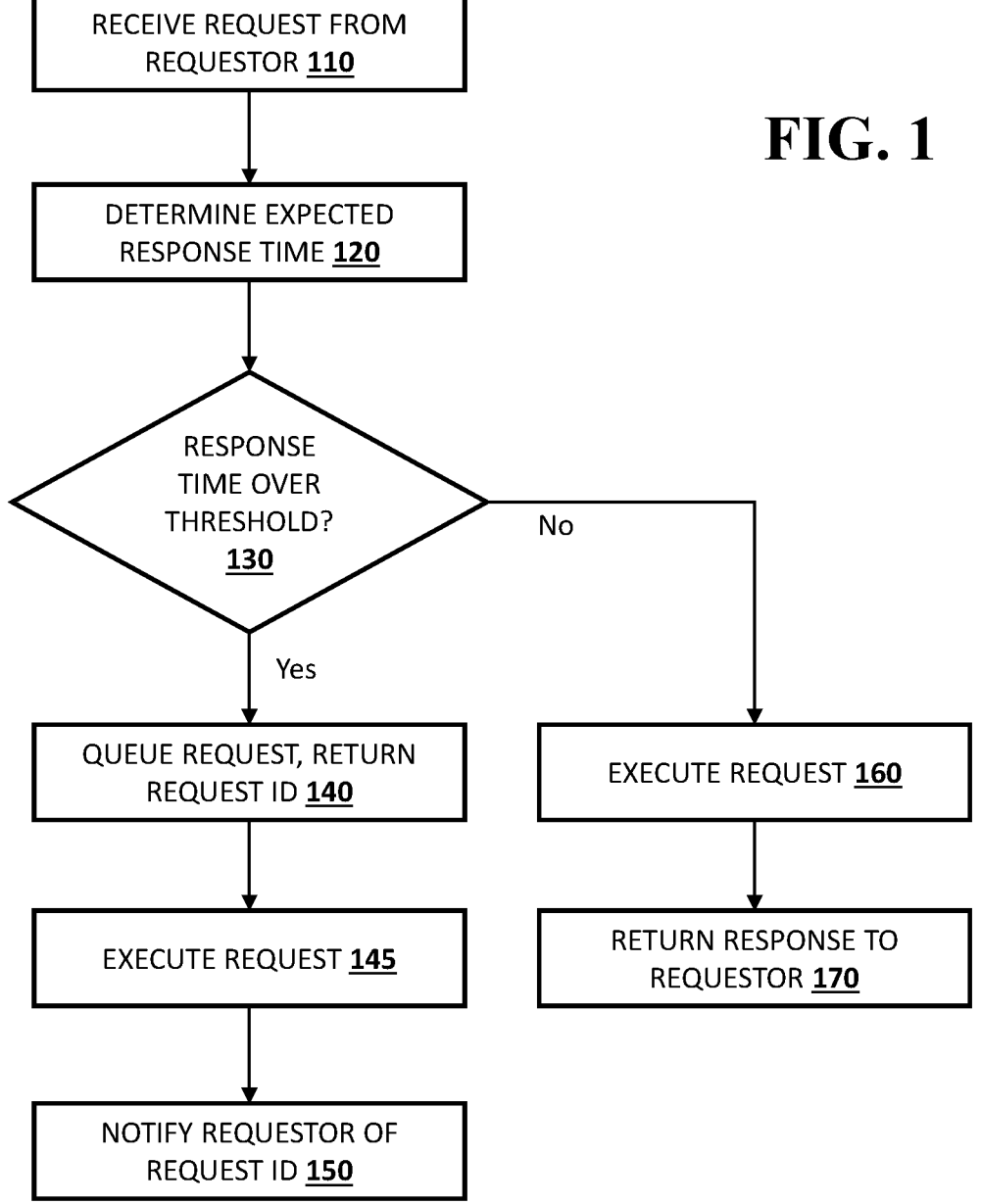
FIG. 1 shows an example process for synchronous and asynchronous operation of a single API or equivalent request/response system.

Many modern computerized systems allow for both synchronous and asynchronous execution of requests such as API requests. This allows developers to structure API execution based on overall expected performance at the cost of flexibility at runtime. For example, even for a small customer with a query that will not take long to execute or have a large response payload, the response will still not be returned immediately if the API is written asynchronously. This may occur, for example, when the API is expected to handle both large and small requests, i.e., requests that can take varying amounts of time to execute. If an API needs to be capable of both synchronous and asynchronous responses, such systems typically require developers to create and maintain two separate APIs. Requesting services then select or are routed to the appropriate API.

Embodiments disclosed herein provide a smart service that sits between user requestors and the backend API execution system, which determines whether each request should be run synchronously or asynchronously based on a predicted execution time for the request. The predicted execution time generally is determined at the time the request is initially received from the requesting service, user, application, or the like. Systems that provide both synchronous and asynchronous request execution often are designed for internal use, i.e., in situations where other services in the system access the APIs. Embodiments disclosed herein may be described in terms of a requesting "service," but it will be understood that the features and embodiments so described apply equally to any requestor, including internal or external applications, users, services, and the like.

The prediction of execution time may be made by a machine learning system based on, for example, the identity of the requesting organization, user, or service, the particular API being accessed, payload size, batch size, prior execution times, or the like. In contrast to conventional systems that require developers to create and maintain both synchronous and asynchronous APIs, in embodiments disclosed herein developers only need to provide a generic service API without determining at development time whether to execute the API synchronously or asynchronously. At execution time, if the predicted response time is over a threshold, the request is executed asynchronously; and if not, the request is executed synchronously.

Embodiments disclosed herein accordingly allow for faster, more accurate development of multi-mode APIs that can operate both synchronously and asynchronously depending on the expected execution time of each request. This also improves operation of the system at execution time, as the possibility of disparate operation by separate synchronous/asynchronous APIs is removed. The service also allows for more efficient maintenance of the API since developers no longer have to design independent and separate APIs based on execution type. Notably, the smart service disclosed herein allows for the "same" request to be processed either synchronously or asynchronously depending on the identity of the requestor and other related variables and conditions. As used herein, two requests are the "same" if they access the same API using the same parameters (or identical requests otherwise where a formal API is not used). Depending on the requesting user and/or the organization to which the user belongs, the same request may have very different processing times, return payloads, and the like. For example, a request for "all customer contact information" initiated by a user of a small local organization that has only a few dozen customers will have a very different execution times and payload than the same request for "all customer contact information" initiated by the head of a multi-national corporation that has tens of millions of customers, even though the requests provided to the API by the two users are identical in terms of the request itself and the associated parameters.

FIG. 1 shows an example process for synchronous and asynchronous operation of a single API or equivalent request/response system as disclosed herein. At 110 a request is received from a requestor. The immediate requestor may be a user, an application, a service, or any other entity or process that can execute requests via the API. If the immediate requestor is a process such as a service or an application, the request generally is being made on behalf, or with respect to a user, organization, or similar entity. For example, an end user may be operating a user interface to a CRM or similar system, which operates multiple services through a backend system in response to actions taken by the user. In this case the call sent to an API is being sent by one of those services with respect to that user and/or that user's organization in the system, though the request may be described as being made "by the user" as is common in the art. At 120, the system determines the expected response time of the request, i.e., the amount of time the request is expected to require to execute fully. The expected response time may be an estimate based on one or more prior executions of the same or similar requests by the same or similar users, or based on aggregated data related to multiple users and/or organizations, or the like. The expected response time also may be provided by another service, such as a machine learning or other artificial intelligence system, which may use data from prior request/response pairs to provide the expected response time.

At 130, the expected response time may be compared to a threshold to determine if the request should be executed synchronously or asynchronously. The threshold may be set via configuration parameters by developers of the API or the system as a whole. Alternatively or in addition, it may be determined dynamically based on the current state of the API, the system, the user or organization account(s), or the like. Each API may have its own threshold, or the system as a whole may have one or more thresholds that are applied to each API based on configuration parameters, current operational load of the system, or the like.

If the expected response time is at least the threshold time period, the request is processed asynchronously at 140-150. Alternatively, if the expected response time is less than the threshold, the request is processed synchronously at 160-170.

Figure 2A:
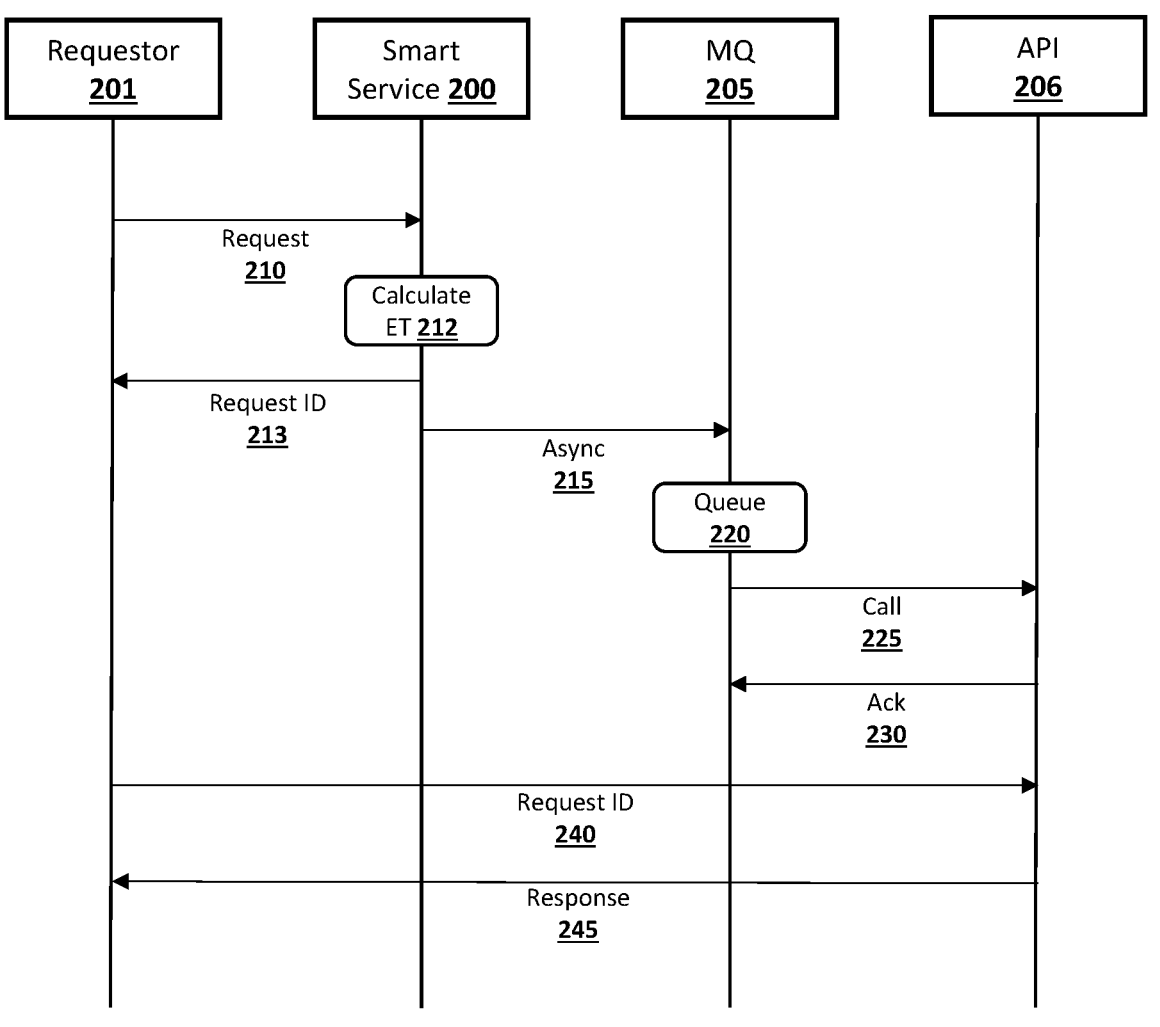
FIGS. 2A and 2B show asynchronous and synchronous operation of the smart service and backend API, respectively.

When the expected response time meets the threshold, at 140 the request may be queued such as via a conventional message queue, and a request identifier ("request ID") is returned may be returned to the smart service and/or the requestor for later use in retrieving the response to the request. The request is executed at 145 by the API, for example in much the same fashion as it would be if the API was configured as an asynchronous API in a conventional dual-API system as previously described. At 150, the request ID is returned to the requestor to allow for later retrieval of the response. This process may be effectively completed in a variety of ways, such as shown in FIG. 2A. For example, the asynchronous service may send a notification with the request ID to the requestor. Alternatively, another status API may be exposed to provide the status of the request or to provide the response to the request (i.e., the result of the request) using the same request ID.

When the expected response time is below the threshold, the API executes the request at 160 and immediately returns the associated response to the requestor at 170. This synchronous execution may be performed by the API in much the same fashion as if the API was only available for synchronous requests in a dual-API system as previously described.

Figure 2B:
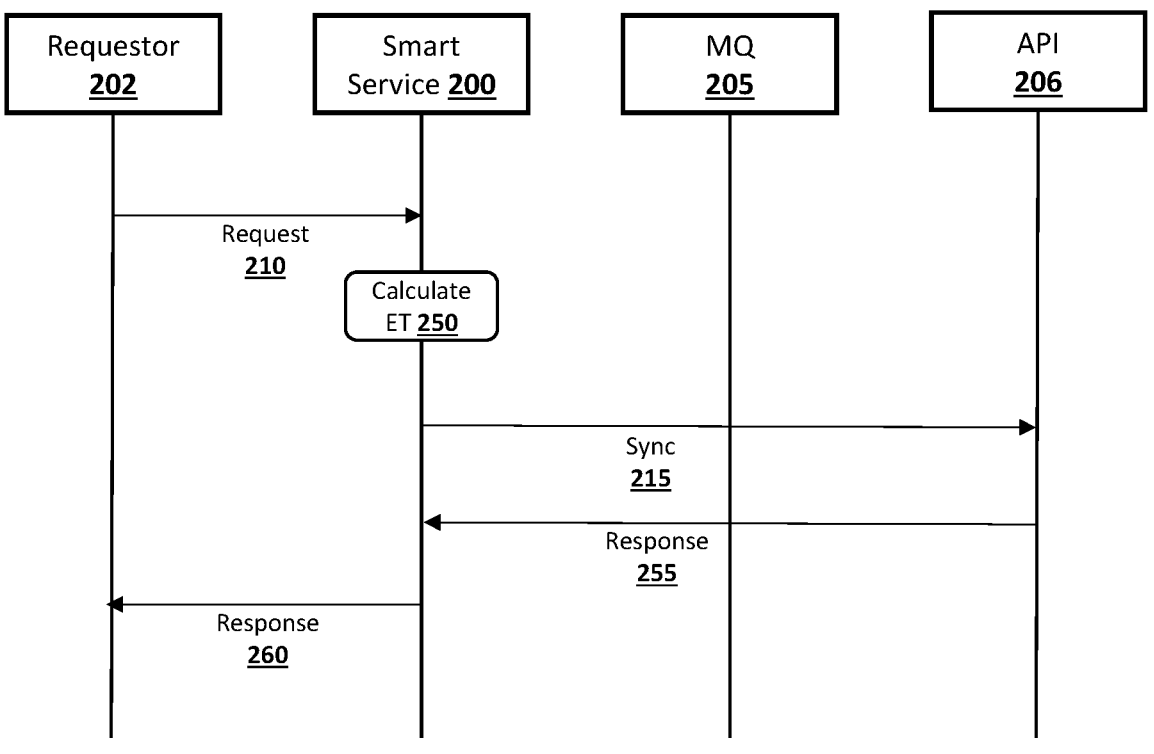

FIGS. 2A and 2B show asynchronous and synchronous operation of the smart service and backend API, respectively. A requestor 201 sends an API request or equivalent request at 210, which is received by the smart service 200. The operation and presence of the smart service 200 may be undetectable to the requestor 201. That is, from the requestor's perspective, the API may appear to operate as if there was no intervening smart service, though in some embodiments the requestor may be informed in which mode the API is operating so the requestor will know whether a request ID needs to be used to retrieve the response at a later time.

After receiving the request 210, the smart service 200 calculates the expected response time (ET) at 212 and compares it to a threshold as previously disclosed. In the case of asynchronous operation shown in FIG. 2A, the smart service determines that the expected response time is at least equal to the threshold, so a request ID is returned to the requestor 201. The request ID may be obtained from the API 206, or it may be generated by the smart service 200 or the messaging queue 205 and provided to the API 206, for example via the API call 225.

After determining that the request should be executed asynchronously, the smart service 200 may pass the request received at 210 to a messaging queue 205 to be queued at 220 for execution by the API 206. Alternatively, the smart service 200 may send the request 215 directly to the API 206 for management by the API, which may, for example, have its own messaging queue or equivalent process that is used to manage asynchronous requests. In some embodiments, the API 206 may be implemented as a simple service that executes code on the given thread, eliminating the need for a message queue or equivalent and allowing for immediate execution.

The request is then sent to the API 206 as an API call 225, either via a messaging queue 205 or directly from the smart service 200 as previously disclosed. The API 206 may acknowledge receipt of the call at 230, and/or it may provide an indication to the messaging queue 205 when the request has been completed.

After completion of the request by the API 206, the requestor 201 may retrieve the response by providing the request ID at 240. The API 206 then returns the response payload at 245. In some embodiments, the response 245 may be first passed to the smart service 200 for delivery to the requestor 201, such as where the requestor 201 only communicates directly with the smart service 200 and does not have direct access to the API 206. For example, the smart service 200 may intercept conventional calls by the requestor 201 to the API 206, including both the initial request 210 and the subsequent request 240 which includes the request ID.

Referring to FIG. 2B, if the expected response time calculated by the smart service 200 at 250 is below the threshold, the request may be processed synchronously as previously disclosed. In this case the smart service 200 may directly send the synchronous request 215 to the API and receive a response 255 immediately after processing of the request by the API 206. The response payload 260 is then provided to the requestor 202 without a need for the requestor 202 to provide a request ID as described with respect to FIG. 2A.

Figure 3:
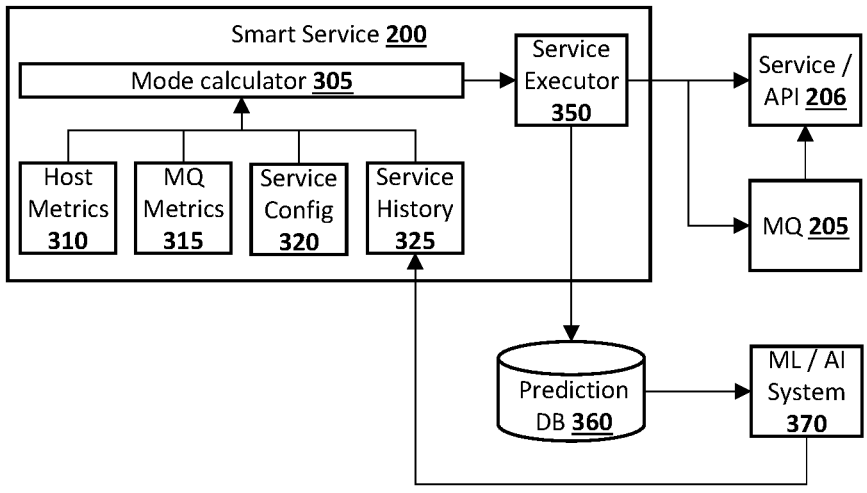
FIG. 3 shows an example schematic representation of a smart service 200 as disclosed herein.

The processes disclosed herein may be implemented by any suitable architecture and computer system. FIG. 3 shows an example schematic representation of a smart service 200 and related services as disclosed herein. The specific logical modules and operations shown in FIG. 3 are illustrative and are not intended to limit the scope or content of embodiments disclosed herein. Other arrangements may be used and various components may be omitted, combined, or configured in different ways than those specifically shown. The smart service 200 may include, for example, a mode calculator 305 that determines whether a request should be executed in synchronous or asynchronous mode and a service executor module 350 that coordinates communication between the smart service 200 and the API 206 or equivalent service, for example to make synchronous and asynchronous requests to the API. In some embodiments, the service executor 350 or equivalent component may explicitly indicate to the API 206 whether each request is synchronous or asynchronous.

The mode calculator 305 may use data from a range of sources to make a determination of which mode to use for each request. For example, host metrics 310 related to the current logical and/or physical host of the API 206 may be used, optionally in conjunction with the specific threshold set for the system or the API 206. Examples of host metrics 310 include the number of active connections or connections per unit time at the host, available server memory, database and/or CPU utilization, server bandwidth use, and the like.

Messaging queue metrics 315 may indicate the current state of the messaging queue 206 as previously disclosed, for example to determine the expected processing time for a queued request to be processed by the messaging queue.

Specific metrics used for the messaging queue may include, for example, the same considerations used for the host metrics 310.

Configurations options 320 for the service/API 206 and historical performance 325 of the service also may be considered. The service configuration 320 may include, for example, a maximum batch size for the API, a static mode set by the API, and an API identifier. A static mode may be allowed for cases where the API is configured only for synchronous or asynchronous execution, in which case such configuration 320 may override other considerations and cause the mode calculator 305 to select only the single mode for which the API is configured. Alternatively, the configuration 320 may specify a preferred operation mode but allow for other modes, such as by indicating that asynchronous operation is preferred but synchronous operation may be used for some requests, such as where there are a relatively small number of requests in an associated messaging queue, where the request and/or expected response is relatively small, where the requestor is associated with a relatively small organization or a relatively small amount of stored data that could be used to construct the response, or the like. Other data used to predict the response time (i.e., the execution time of the API 206 for the specific request) may include a user and/or organization identifier, the specific API 206 being used, the date and/or time of the request, the payload size of the request and/or the expected size of the response payload, a batch size if the request is a batch request, and the actual execution time of the API service generally.

The service executor 350 also may communicate with the messaging queue 205 as previously disclosed and shown in FIGS. 2A-2B.

As previously disclosed, expected response times may be determined in whole or in part by a machine learning system 370, which may operate in conjunction with a database of prior request/response execution pairs 360. For example, the machine learning system 370 may be trained on prior request/response pairs to predict an expected response time based on the host metrics 210, messaging queue metrics 315, historical performance 325, user and/or organization IDs, API ID, date and/or time of the request, payload size(s), batch size, API execution time, or any combination thereof.

Figure 4:
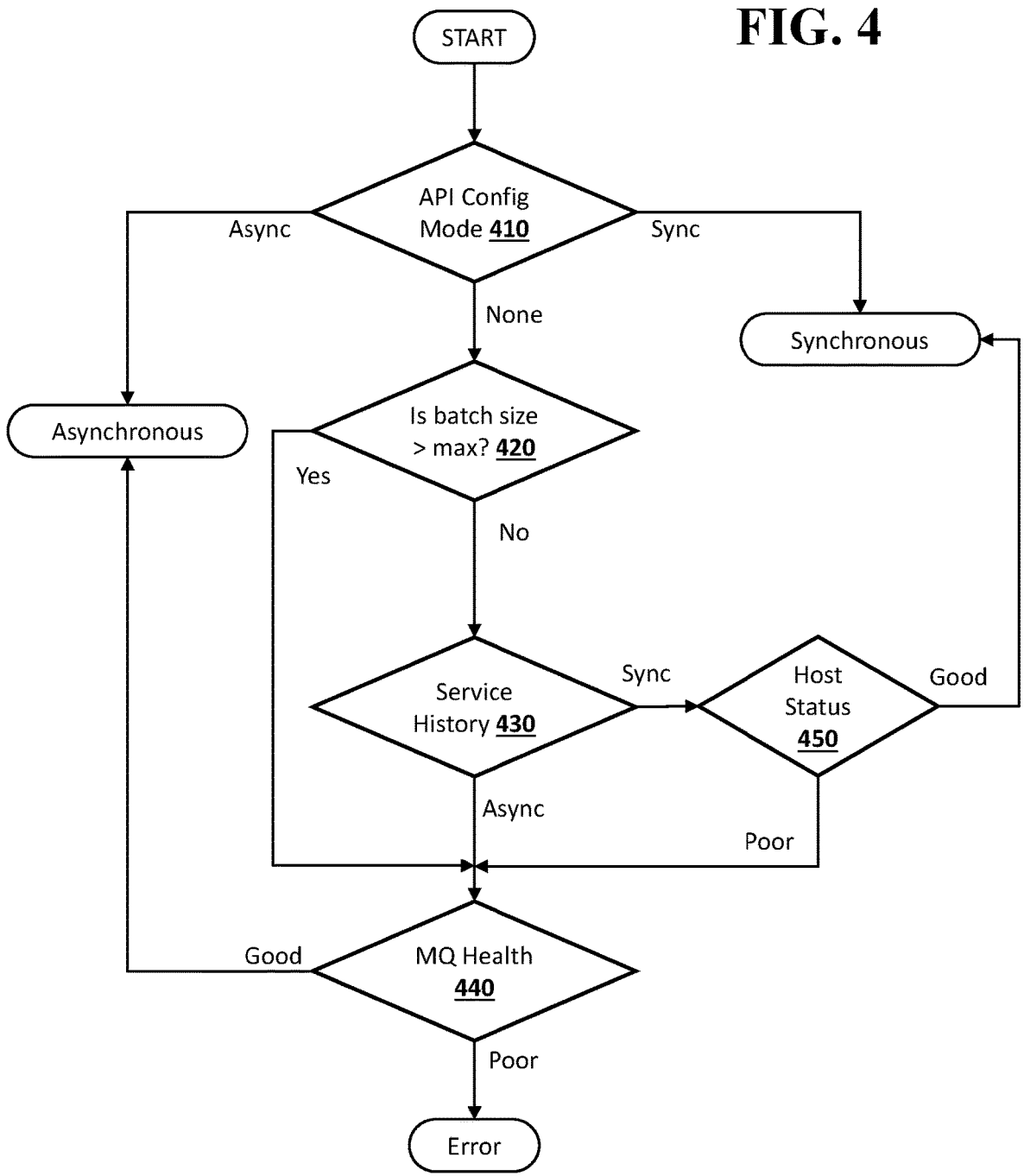
FIG. 4 shows an example process to select an API operating mode for a particular request as disclosed herein.

FIG. 4 shows an example process which may be used by embodiments disclosed herein to select an API operating mode for a particular request. The example shown in FIG. 4 is illustrative and other processes, configurations, and attributes may be used. Alternatively or in addition, an expected response time as calculated by a machine learning system 370 may be used as previously disclosed.

At 410, the process determines if a static configuration mode is set for the API. If no mode is set, at 420 the request is analyzed to determine if it is a batch request and, if so, if the batch size exceeds a maximum batch size for the API. If the maximum size is exceeded, the process may continue to 440; otherwise it may continue to 430.

At 430 the history of the API service is considered to determine if it has previously operated exclusively or predominantly in a synchronous or asynchronous mode, in which case the same mode may be used. However, if a host status 450 as previously disclosed is considered poor, the process may return to 420 to consider whether smaller batch sizes are required. In some embodiments, the host status may be tracked using a "traffic light" or similar arrangement, with a "green" or "good" condition corresponding to host status that is acceptable to proceed as shown, and "red" or "poor" status indicating that the host cannot proceed as desired. In such embodiments, various thresholds for host operational status may be set to correspond to the various status indicators.

At 440 the health of the messaging queue may be considered. The process may terminate with an error if the messaging queue is experiencing technical issues, a severe backlog of messages, or the like, to prevent an asynchronous request from exacerbating any such issues.

When considering the relative health or other status of components of the system, existing thresholds and indicators may be used. For example, many systems that make use of a messaging queue include techniques to query the status of the queue and determine if further requests should be queued. These same indicators may be used with embodiments disclosed herein to inform whether a particular request can be processed synchronously, or whether issues in the API host, the messaging queue, or other components of the system indicate that asynchronous operation may be preferred.

Embodiments disclosed herein may use any suitable or desirable value for the expected response time threshold, such as 200 ms or less, 300 ms or less, 400 ms or less, 500 ms or less, 600 ms or less, 700 ms or less, 800 ms or less, 900 ms or less, 1000 ms or less, or any intervening or other time period.

In some embodiments, the smart service 200 may provide a single endpoint for conventional synchronous and asynchronous versions of a single API, thus allowing developers to take advantage of the service without the need to rewrite the entire APIs. Such embodiments still simplify development and maintenance of the APIs since all communications with requestors will be routed through the smart service, thereby reducing complexity and simplifying development and maintenance of the requestor services which no longer need to manage two types of API calls. More generally, embodiments disclosed herein provide improvements to conventional API-based computerized systems as well as the underlying computer systems themselves through the use of a single endpoint for both synchronous and asynchronous API execution. For example, embodiments disclosed herein may allow a requestor service to provide a preference as to how an API request is executed without requiring the requestor service to include two types of API call for the same request. Embodiments disclosed herein also allow for a single API framework to be used regardless of the size of the organizations using the framework, since larger organizations (or organizations of any size with large amounts of data) may be routed to asynchronous operation, while smaller organizations or those with smaller amounts of data may be routed to synchronous operation. The smart service also may be maintained separately from the APIs that is services, further simplifying development and maintenance by isolating the synchronous/asynchronous calculations and communications with requestor entities from the APIs.

Figure 5:
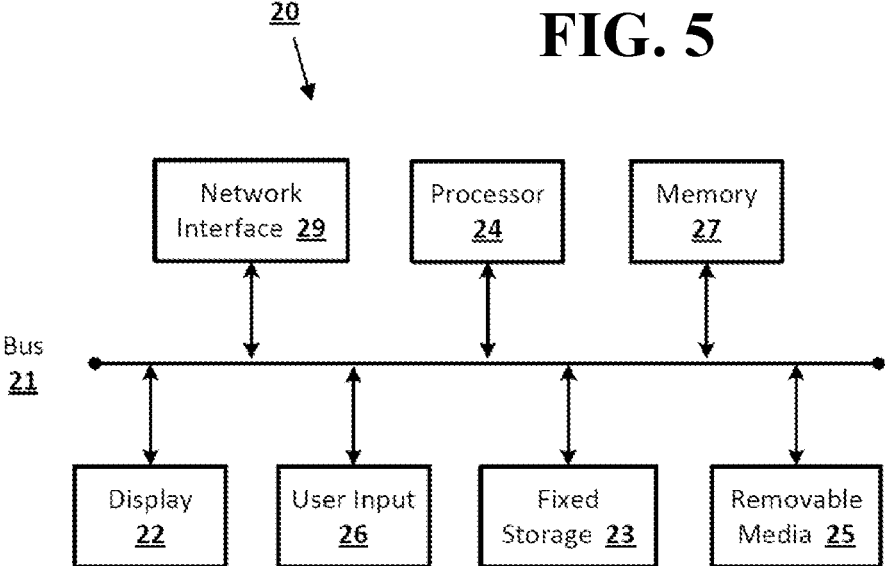
FIG. 5 is an example computing device suitable for implementing aspects of embodiments disclosed herein.

Embodiments disclosed herein may be implemented in and used with a variety of component and network architectures. FIG. 5 is an example computing device 20 suitable for implementing aspects of embodiments disclosed herein, including but not limited to a server or cloud computing component suitable for hosting and/or implementing an application as disclosed herein, a device accessing a backend system such as via one or more APIs as disclosed herein, a backend system accessed by one or more cloud-based applications, or the like. The device 20 may be, for example, a desktop or laptop computer, a mobile computing device such as a phone or tablet, or the like, a rack-based and/or headless server or other server architecture, or the like.

The device 20 may include a bus 21 which interconnects major components of the computer 20, such as a central processor 24, a memory 27 such as Random Access Memory (RAM) or the like, a user display or other output device 22 such as a display screen, one or more user input devices 26, which may include one or more controllers and associated user input devices such as a keyboard, mouse, touch screen, and the like, a fixed storage 23 such as a hard drive, flash storage, and the like, a removable storage unit 25 operative to control and receive an optical disk, flash drive, and the like, and a network interface 29 operable to communicate with one or more remote devices via a suitable network connection.

The bus 21 allows data communication between the central processor 24 and one or more memory components. Applications resident with the computer 20 are generally stored on and accessed via a computer readable medium, such as a fixed storage 23 and/or a removable storage 25 such as an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the computer to communicate with other computers via one or more local, wide-area, or other communication networks. Other components may be included and some described components may be omitted without departing from the scope or content of the disclosed embodiments. For example, in embodiments in which the disclosed systems and methods are embodied in a server farm or rack system or similar, the system may include various system-level cooling components, communication interfaces, or the like.

More generally, various embodiments may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method comprising:

receiving a first request from a first requestor;

determining a first expected response time for the first request received from the first requestor based on a prior execution time of the first request and a first host system status;

determining that an application programming interface (API) for the first request does not operate exclusively in a synchronous mode;

determining that further requests can be queued on a messaging queue for the API;

responsive to determining that the first expected response time is over a threshold period and that the API for the first request does not operate exclusively in the synchronous mode and that further requests can be queued on a messaging queue for the API, executing the first request received from the first requestor asynchronously and providing a request identifier to the first requestor;

receiving a request identical to the first request from a second requestor;

determining a second expected response time for the request identical to the first request received from the second requestor based on the prior execution time of the first request and a second host system status;

determining that the application programming interface (API) does not operate exclusively in an asynchronous mode;

determining that the second host system status is a good status; and responsive to determining that the second expected response time is not over the threshold, that the API does not operate exclusively in the asynchronous mode, and that the second host system status is a good status, executing the request identical to the first request received from the second requestor synchronously and providing a response to the request identical to first request to the second requestor.

2. The method of claim 1, wherein the prior execution time of the first request is provided by a machine learning system based on a plurality of prior execution times of the first request.

3. The method of claim 2, wherein the prior execution time of the first request is calculated by the machine learning system based on one or more selected from the group comprising: an identity of the first requestor, the prior execution time of the first request, the first host system status, and a size of the first request.

4. The method of claim 3, wherein the second expected response time for the request identical to the first request is determined by the machine learning system.

5. The method of claim 1, further comprising:

receiving, from the first requestor, an indication of the request identifier; and responsive to receiving the indication of the request identifier, providing to the first requestor a response to the first request received from the first requestor.

6. The method of claim 1, wherein the first request is an API call.

7. A system for managing requests in a computerized data system, the system comprising:

a plurality of instructions stored on a computer-readable medium;

one or more computer processors configured to execute the plurality of instructions to operate a service to receive and process requests, the service configured to:

receive a first request from a first requestor;

determine a first expected response time for the first request received from the first requestor based on a prior execution time of the first request and a first host system status;

determine that an application programming interface (API) for the first request does not operate exclusively in a synchronous mode;

determine that further requests can be queued on a messaging queue for the API;

responsive to determining that the first expected response time is over a threshold period and that the API for the first request does not operate exclusively in the synchronous mode and that further requests can be queued on a messaging queue for the API, execute the first request received from the first requestor asynchronously and providing a request identifier to the first requestor;

receive a request identical to the first request from a second requestor;

determine a second expected response time for the request identical to the first request received from the second requestor based on the prior execution time of the first request and a second host system status;

determine that the application programming interface (API) does not operate exclusively in an asynchronous mode;

determine that the second host system status is a good status; and responsive to determining that the second expected response time is not over the threshold, that the API does not operate exclusively in the asynchronous mode, and that the second host system status is a good status, execute the request identical to the first request received from the second requestor synchronously and providing a response to the request identical to the first request to the second requestor.

8. The system of claim 7, further comprising a machine learning system configured to provide the prior execution time of the first request based on a plurality of prior execution times of the first request.

9. The system of claim 8, wherein the prior execution time of the first request is calculated by the machine learning system based on one or more selected from the group comprising: the identity of the first requestor, the prior execution time of the first request, the first host system status, and a size of the first request.

10. The system of claim 9, wherein the second expected response time for the request identical to the first request is determined by the machine learning system.

11. The system of claim 7, the service further configured to:

receive, from the first requestor, an indication of the request identifier; and responsive to receiving the indication of the request identifier, provide to the first requestor a response to the first request received from the first requestor.

12. The method of claim 1, wherein the first request is an API call.

13. A non-transitory computer-readable medium storing a plurality of instructions which, when executed by a computer processor, cause the processor to:

receive a first request from a first requestor;

determine a first expected response time for the first request received from the first requestor based on a prior execution time of the first request and a first host system status;

determine that an application programming interface (API) for the first request does not operate exclusively in a synchronous mode;

determine that further requests can be queued on a messaging queue for the API;

responsive to determining that the first expected response time is over a threshold period and that the API for the first request does not operate exclusively in the synchronous mode and that further requests can be queued on a messaging queue for the API, execute the first request received from the first requestor asynchronously and providing a request identifier to the first requestor;

receive a request identical to the first request from a second requestor;

determine a second expected response time for the request identical to the first request received from the second requestor based on the prior execution time of the first request and a second host system status;

determine that the application programming interface (API) does not operate exclusively in an asynchronous mode;

determine that the second host system status is a good status; and responsive to determining that the second expected response time is not over the threshold, that the API does not operate exclusively in the asynchronous mode, and that the second host system status is a good status, execute the request identical to the first request received from the second requestor synchronously and providing a response to the request identical to the first request to the second requestor.

14. The computer-readable medium of claim 13, wherein the prior execution time of the first request is provided by a machine learning system based on a plurality of prior execution times of the first request.

15. The computer-readable medium of claim 14, wherein the prior execution time of the first request is calculated by the machine learning system based on one or more selected from the group comprising: the identity of the first requestor, the prior execution time of the first request, the first host system status, and a size of the first request.

16. The computer-readable medium of claim 15, wherein the second expected response time for the request identical to the first request is determined by the machine learning system.

17. The computer-readable medium of claim 13, the instructions further causing the processor to:

receive, from the first requestor, an indication of the request identifier; and responsive to receiving the indication of the request identifier, provide to the first requestor a response to the first request received from the first requestor.

18. The computer-readable medium of claim 13, wherein the first request is an API call.

* * * * *